Patented Feb. 11, 1941

2,231,612

UNITED STATES PATENT OFFICE 2,231,612

PHENANTHROLINE DERIVATIVE

Jacob Böeseken, Delft, and Ulbe Gerrit Bijlsma, Utrecht, Netherlands

No Drawing. Application September 21, 1939, Serial No. 295,988. In the Netherlands December 22, 1934

14 Claims. (Cl. 260—288)

Our invention relates to a process of preparing substances of the phenanthroline series which are therapeutically active, and which contain not only the nitrogen atoms of the phenanthroline ring system but which also contain at least one additional nitrogen atom, in a substituted or unsubstituted amino group, in a substituent for one of the hydrogen atoms of the benzene nucleus of the phenanthroline. This substitution of the amino group (substituted or unsubstituted), is effected in the 5 position or the 6 position, m-phenanthroline being represented by the formula

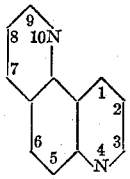

These novel substances possess to a more or less degree an anodyne action and also a bactericidal action so that those substances are of value from a therapeutical standpoint.

The process according to the invention possesses the characterizing feature that substituted phenanthrolines are converted directly or indirectly into amino-phenanthrolines or into aminophenanthrolines substituted in the amino group, or that R-amino-phenylenediamine or R-aminoamino-quinolines wherein R is a monovalent organic radical (and particularly an alkyl or substituted alkyl radical), are converted to aminophenanthrolines by a Skraup synthesis.

The direct preparation of amino-meta-phenanthrolines substituted in the amino group is carried out by the reaction of halogen-meta-phenanthrolines, in which the halogen atom is connected to the benzene nucleus of the phenanthroline-ring system, upon primary or secondary amines with the evolution of hydrogen halide.

Amino-meta-phenanthrolines substituted in the amino group can be prepared indirectly by first preparing amino-meta-phenanthrolines unsubstituted in the amino group, e. g. by reduction of nitro-meta-phenanthrolines or by the action of ammonia upon halogen-meta-phenanthrolines with evolution of hydrogen halide or by conversion of meta-phenanthroline carboxylic acid amides according to the Hofmann reaction, and by subsequently substituting one or both of the hydrogen atoms of the amino group of the amino-meta-phenanthrolines by the action of carboxylic acids or carboxylic acid anhydrides, substances which possess a halogen atom suitable for this reaction, as e. g. carboxylic acid halides, halogen substituted carboxylic acids, alkyl halides, mono- or dialkyl-amino-alkyl-halides etc.

Our invention will be elucidated with reference to the following examples:

1. Preparation of 6-amino-m-phenanthroline. Formula:

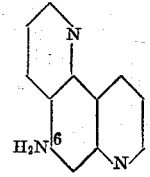

To 1200 c. c. of a solution of stannous chloride obtained by dissolving 210 g. of tin in muriatic acid, are added 100 g. of 6-nitro-m-phenanthroline. After heating on the water bath and cooling, the double salt is sucked off and decomposed in the known way.

By recrystallization e. g. from alcohol the light yellow 6-amino-m-phenanthroline is purified; melting point about 200° C.

2. Preparation of 5-amino-m-phenanthroline. Formula:

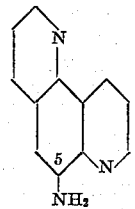

100 g. of 5-bromo-m-phenanthroline, 100 g. of phenol and 300 c. c. of a watery ammonia solution of specific gravity 0.91 are heated for 20–80 hours in a closed pressure vessel to about 150–200° C. (Also by introducing ammonia gas in the molten mixture of 5-bromo-phenanthroline and phenol, conversion to 5-amino-m-phenanthroline is obtained).

The phenolic layer is fractionated in a simple way by distillation. After the water and ammonia are removed, phenol is distilled at normal vacuum.

The residue is distilled at very greatly reduced pressure, the 5-amino-m-phenanthroline distilling easily in high vacuum at a bath temperature of about 150°–170° C.

By recrystallization e. g. from alcohol the pure yellow, 5-amino-m-phenanthroline is obtained with a melting point of 143° C.

This body could also be produced similarly to Example 1, if desired.

3. Preparation of N-diethylamino-ethyl-5-amino-m-phenanthroline. Formula:

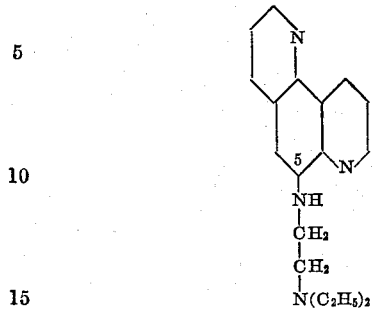

181 g. of 5-amino-m-phenanthroline and 172 g. of diethyl-amino-ethylchloride-hydrochloride after being thoroughly mixed are heated in an oil bath for 8 hours to about 170 to 190° C. After dissolving in water and filtration the filtrate is made alkaline. The precipitating oil is taken up in ether, after which the ether solution is dehydrated with anhydrous potash. After distilling off the ether the remaining oil is fractionated and distilled. Under a high vacuum the base distills easily at a bath temperature of about 190° C.

The compound is viscous gold-yellow oil. By dissolving in dry ether and introducing muriatic acid gas the orange hydrochloride is obtained.

4. Preparation of N-(γ-diethylaminopropyl-)-5-amino-m-phenanthroline. Formula:

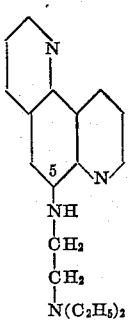

181 g. of 5-amino-m-phenanthroline and 186 g. of γ-diethyl-aminopropylchloride-hydrochloride after being thoroughly mixed, are heated in an oil bath for 8 hours to about 170–190° C.

After the same treatment as mentioned in Example 3 the golden-yellow thick liquid base is obtained by distillation under high vacuum at a bath temperature of about 200–230° C.

It is to be understood that instead of compounds with the particular alkyl groups ethyl and propyl, in Examples 3 and 4, analogous compounds containing other alkyl groups can be used, in the analogous manner. Instead of the di-ethyl derivatives used, mono-ethyl, or mono-alkyl derivatives can be similarly used, within the scope of our invention.

5. Preparation of 5-acetylamino-m-phenanthroline. Formula:

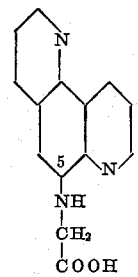

20 g. of 5-amino-m-phenanthroline are heated with an excess, e. g. 15 grams, of acetic acid anhydride. After adding water and heating one neutralizes with lye and the white 5-acetyl-amino-m-phenanthroline is sucked off. By recrystallization from alcohol the substance is purified. Melting point 201° C.

Instead of the acetic anhydride, as used in this example, the anhydrides of the homologues of acetic acid can be used, or anhydrides of other carboxylic acids which are derivatives of acetic acid, such as propionic acid, phenyl acetic acid and the like.

6. Preparation of 5-benzoylamino-m-phenanthroline:

15 g. of benzoyl chloride is added to a suspension of 20 g. 5-amino-m-phenanthroline in ether. After boiling some time the mass is dried by evaporation. The residue is taken up in water, sucked off and purified by recrystallization from alcohol. The 5-benzoylamino-m-phenanthroline obtained in this way is white and melts at 170° C.

It will be understood that homologues of benzoyl chloride can be similarly used, e. g. p-nitro-benzoyl-chloride.

7. Preparation of m-phenanthroline-5-amino-acetic acid. Formula:

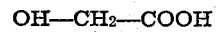

18 g. of 5-amino-m-phenanthroline, 9.5 g. of chloracetic acid and 150 c. c. of water are heated on a steam bath for some hours. After cooling the yellow precipitate is sucked off and purified by boiling the ammoniacal diluted alcoholic solution with decolorizing carbon, and precipitating the substance from the filtrate by means of a small quantity of acid, melting point 244° C.

Homologues of chloracetic acid can be similarly employed. Hydroxy-acetic acid is

OH—CH$_2$—COOH

The group —CH$_2$COOH will be hereinafter referred to as the hydroxy-acetic acid residue and the analogous groups from hydroxy-acetic acid and its homologues will be included in the generic term hydroxy-fatty acid residue.

8. Preparation of 5-diethylamino-m-phenanthroline. Formula:

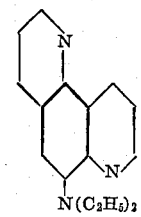

60 g. of 5-bromo-m-phenanthroline, 60 g. of phenol and 200 c. c. of a 33% or more concentrated solution of diethylamine in water are heated in a closed pressure vessel to about 150–200° C. The phenolic layer is fractionated in a simple way by distillation. After the phenol has been distilled off, the residue is distilled under very reduced pressure and a gold yellow oil is obtained in high vacuum at a bath temperature of about 140–180° C. From this oil the 5-diethylamino-m- phenanthroline is separated by dissolving the oil in diluted hydrochloric acid and by evaporating the solution; by fractional crystallization one obtains the hydrochloric acid salt from which the free base is obtained by dissolving in water and precipitating with diluted ammonia. After recrystallization from alcohol the light yellow product melts at 64° C.

By this reaction there is also formed 5-ethyl-amino-m-phenanthroline and m-phenanthroline.

Instead of the diethyl amine, it will be understood that other dialkyl amines can be similarly used.

9. Preparation of 5-ethylamino-m-phenanthroline:

In a closed pressure vessel 1 part by weight of 5-amino-m-phenanthroline is heated with more than the calculated proportion (e. g. 1 part by weight) of ethylbromide for some hours to 100° C. After distilling off the ethyl bromide, the hydrobromic acid salt is dissolved in water. By making alkaline by means of ammonia, the base is separated which is then purified by recrystallization from alcohol. The raw base may be also distilled in vacuo and may be purified by recrystallizing the distillate. The base is yellow and melts at 79° C.

In the same way 5-methyl-amino-m-phenanthroline, melting point 74° C. and 5-allyl-amino-m-phenanthroline, melting point 47° C. are prepared.

10. Preparation of 5-diethylamino-m-phenanthroline. Formula: (as given in Example 8).

In a closed pressure vessel 1 part by weight of 5-ethyl-amino-m-phenanthroline is heated with more than the calculated proportion (e. g. 1 part by weight) of ethyl-bromide for 15 hours to 130° C. After the same treatments as described in Example 9 the light yellow base with a melting point of 64° C. is obtained.

It will be understood that in Examples 9 and 10, instead of ethyl bromide, other alkyl halides (preferably other alkyl bromides) can be employed in like manner.

11. Preparation of N-dimethyl-amino-ethyl-5-amino-m-phenanthroline:

181 g. of 5-amino-m-phenanthroline and 144 g. of dimethyl-amino-ethyl-chloride-chlorhydrate, after being thoroughly mixed, are heated on an oil bath for 8 hours at about 170–190° C. The base is purified in the way indicated in Example 3.

12. Preparation of 5-diethylamino-m-phenanthroline. Formula: (as given in Example 8).

20 g. of hydrochloride of 4-diethylamino-m-phenylene diamine, 33 g. of arsenic-pentoxide, 40 c. c. of glycerine and 30 c. c. of concentrated sulphuric acid are heated just to the boiling point in an oil bath for 6 hours under a reflux condenser, and during the first part of the heating hydrochloric acid is evolved.

After diluting with water and making strongly alkaline with ammonia, the separated base is taken up in ether. After dehydrating the ether solution by means of anhydrous potash the ether is distilled off and the residue is distilled under greatly reduced pressure.

Under a high vacuum at a bath temperature of 170–190° C. an oil is obtained which can be crystallized by mixing with its own volume of alcohol and cooling. After purification by recrystallization from alcohol the melting point of the light yellow base is 64° C.

During the evaporation of the above ether solution, a solid separates out which, after several recrystallizations from alcohol, is yellow and has a melting point of 175° C. This substance is amino-diethylamino-quinoline.

The above mentioned 4-diethylamino-m-phenylene-di-amino-hydrochloride can be obtained by reducing 4-diethyl-amino-m-di-nitro-benzene by means of stannous chloride. Also the tin double salt may be subjected to the Skraup synthesis, although in this case a closed vessel is preferred in view of the foaming which takes place.

13. Preparation of N-diethyl-amino-ethyl-5-amino-m-phenanthroline:

22 g. of the hydrochloride of 4-diethyl-amino-ethyl-amino-m-phenylene-diamine, 33 g. of arsenic-pentoxide, 40 c. c. of glycerine and 30 c. c. of concentrated sulphuric acid are heated to approximately the boiling point for six hours in an oil bath under a reflux condenser; during the first part of the heating hydrochloric acid escapes. After the same treatments as mentioned in Example 1 the viscous golden yellow liquid base is obtained by high vacuum distillation at a bath temperature of about 190° C.

The 4-diethyl-amino-ethyl-amino-m-phenylene-diamino-hydrochloride can be obtained in the usual way by reduction of 4-diethyl-amino-ethyl-amino-m-dinitro-benzene; the hydrochloride of the raw base separated from the tin double salt may be directly used in the Skraup synthesis.

The 4-3-1-diethyl-amino-ethyl-amino-dinitro-benzene is formed directly by mixing 1 part by weight of 2-4-dinitro-bromo-benzene with N-N-diethyl-ethylene-diamine. After heating for some time at 100° C. the mass is taken up in water. The dark colored solid is sucked off and washed with water. After recrystallization from alcohol the yellow 1-3-4-diethyl-amino-ethyl-amino-m-dinitro-benzene melts at 96° C.

It is also possible to prepare the substance mentioned in the present example by subjecting 5-amino-8-diethyl-amino-ethylamino-quinoline to a Skraup synthesis.

Finally it is possible to prepare the carboxylic acid amides from phenanthroline carboxylic acids and to convert the former compounds into amines according by the Hofmann reaction.

The Skraup synthesis may also be applied to R-amino-phenylene-diamines. Therein R may be: alkyl, aryl, amino-alkyl, amino-aryl, mono- or di-alkyl-amino-alkyl, alkoyl, aroyl, acyl, and the like.

By such a process it will be understood that m-phenanthroline derivatives will be produced containing, in the benzene nucleus, amino groups which contain the groups alkyl, aryl, amino-alkyl, amino-aryl, mono- or di-alkylaminoalkyl, acyl (including alkoyl, aroyl) or allyl, which bodies are intended to all be covered in the present case. We desire it to be understood that in the claims, where the term "acyl" is used, this term is intended to embrace both "alkoyl" and "aroyl".

As examples of derivatives of m-phenanthroline the following are mentioned:

A. 5-chloro-m-phenanthroline
5-bromo-m-phenanthroline
5-iodo-m-phenanthroline, these substances being prepared from 5-amino-m-phenanthroline, the iodine compound, after diazotizing, according to the process of Sandmeyer. (These halogenated bodies are claimed in a copending application 45,686 filed Oct. 18, 1935.)

B. Dyes may be obtained from 5-amino-m-phenanthroline by diazotizing and coupling with phenols, amines and the like. In this way the following substances are obtained:

5-m-phenanthroline-azo-β-naphthol.
5-m-phenanthroline - azo - m-phenylene-di-amine.
5-m-phenanthroline-azo-apocupreine.
5-m-phenanthroline-azo-dihydrocupreine.

C. By the interaction of m-phenanthroline and acid chlorides or acid anhydrides the following substances are obtained: 5-acetyl-, or 5-propionyl-, or 5-stearyl-, or 5-benzoyl-, or 5-phenylacetyl-, or 5-chloro-acetyl-, or 5-p-nitrobenzoyl-, or 5-p-chlorobenzoyl-amino-m-phenanthroline.

D. By means of alkylating 5-amino-m-phenanthroline, the following substances are obtained:

5-methylamino-m-phenanthroline
5-dimethylamino-m-phenanthroline
5-ethylamino-m-phenanthroline
5-diethylamino-m-phenanthroline
5-propylamino-m-phenanthroline
5-allylamino-m-phenanthroline
5-dipropylamino-m-phenanthroline
5-diallylamino-m-phenanthroline
5-phenylamino-m-phenanthroline
5-benzylamino-m-phenanthroline
5-phenylethylamino-m-phenanthroline
5-dimethylaminoethylamino-m-phenanthroline
5-diethylaminopropylamino-m - phenanthroline
5-dimethylaminopropylamino - m - phenanthroline
5-dimethylaminobutyl-m-phenanthroline
5-diethylaminobutyl-m-phenanthroline
5-isobutylamino-m-phenanthroline
5-dimethylamino-amyl-m-phenanthroline
5-diethylamino-amyl-m-phenanthroline
5-isoamylamino-m-phenanthroline
5-hydroxy-ethylamino-m-phenanthroline
5-piperidine-ethylamino-m-phenanthroline E. By means of mono-chloro-acetic acid, glycine-amino-m-phenanthroline may be obtained.

F. 5-hydroxy-m-phenanthroline may be obtained by diazotating and boiling.

G. By means of aldehydes and ketones the following substances are obtained, and water is separated out:

From 5-amino-m-phenanthroline and acetylacetone acetylacetone-5-m-phenanthroline-anil is obtained; melting point 177°; formula:

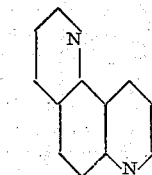
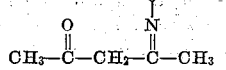

G. 5-m-phenanthroline-urea

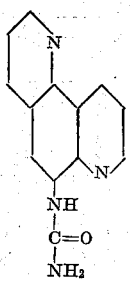

Further other anils than that mentioned under F and other urea-derivatives than that mentioned under G are readily obtainable.

In the present case, the term "amino group" is intended to cover the group —NH₂ whether or not one or both of its H atoms is substituted by an organic radical, such organic radical being any of those indicated herein. This "amino group" is a generic expression including "unsubstituted amino group" and "substituted amino group".

This application is in part a continuation of our copending application, Serial No. 45,687, filed Oct. 18, 1935.

We claim:

1. As a new product, a 5-amino compound of m-phenanthroline.

2. As a new product, a substituted m-phenanthroline, having a substituted amino group in the 5-position on the benzene nucleus, such substituted amino group containing an organic radical bonded to the amino nitrogen.

3. As a new product, a substituted m-phenanthroline, having a substituted amino group in the 5-position on the benzene nucleus, such substituted amino group consisting of nitrogen, carbon and hydrogen only.

4. As a new product, a substituted m-phenanthroline, having a substituted amino group in the 5-position on the benzene nucleus, such substituted amino group being

in which R is a monovalent organic radical containing an alkyl group.

5. As a new product, a substituted m-phenanthroline, having a substituted amino group in the 5-position on the benzene nucleus, such substituted amino group being

in which R is an alkyl amino alkyl group.

6. As a new product, a phenanthroline compound of the general formula

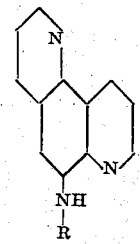

in which R is a dialkyl amino alkyl group.

7. As a new product a phenanthroline compound of the formula

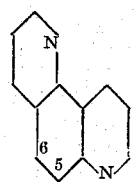

in which at the position 5, an alkyl-amino alkyl group, consisting of nitrogen, hydrogen and carbon is substituted for the nuclear hydrogen atom of the benzene ring.

8. As a new product, a 5-alkylamino-m-phenanthroline.

9. As a new product, 5-diethylamino-ethylamino-m-phenanthroline.

10. As a new product, 5-dimethylamino-ethylamino-m-phenanthroline.

11. As a new product, 5-diethylamino-propylamino-m-phenanthroline.

12. As a new product, a substituted m-phenanthroline in which an amino group is bonded to a carbon atom of the benzene nucleus.

13. A substituted m-phenanthroline in which a hydrogen atom of the benzene nucleus is substituted by a monovalent amino radical containing its nitrogen atom bonded to an organic radical selected from the group consisting of alkyl, aryl, amino-alkyl, amino aryl, mono-alkyl-aminoalkyl, di-alkylaminoalkyl, acyl and allyl.

14. A product as covered in claim 13, in which the said substitution is in position 5.

JACOB BÖESEKEN.
ULBE GERRIT BIJLSMA.